United States Patent [19]
Zurawski

[11] 4,015,932
[45] Apr. 5, 1977

[54] COMBUSTION AIR PREHEATER

[76] Inventor: Daniel A. Zurawski, 4128 Graceway Drive, Toledo, Ohio 43606

[22] Filed: Jan. 30, 1975

[21] Appl. No.: 545,527

[52] U.S. Cl. .............................. 432/179; 432/223; 432/173

[51] Int. Cl.² .............................. F27D 17/00

[58] Field of Search .......... 432/242, 243, 223, 173, 432/177, 193, 189, 179; 122/DIG. 1; 110/56

[56] References Cited

UNITED STATES PATENTS

| 1,106,611 | 8/1914 | Atkinson | 432/179 |
|---|---|---|---|
| 1,288,202 | 12/1918 | Rockwell | 432/179 |
| 1,360,457 | 11/1920 | Sklovsky | 432/179 |
| 1,603,769 | 10/1926 | Heppenstall | 432/179 |
| 2,029,580 | 2/1936 | Merkt | 432/179 |
| 2,358,718 | 9/1944 | Kauffman, Jr. et al. | 432/250 |
| 2,424,587 | 7/1947 | Smith et al. | 122/DIG. 1 |
| 2,582,830 | 1/1952 | Hawley | 122/DIG. 1 |
| 2,627,398 | 2/1953 | Hepburn | 110/56 |
| 2,762,618 | 9/1956 | Johnson et al. | 432/179 |
| 3,148,868 | 9/1964 | Sidwell | 432/179 |
| 3,706,138 | 12/1972 | Schuierer | 432/115 |
| 3,829,285 | 8/1974 | Beck | 432/223 |

FOREIGN PATENTS OR APPLICATIONS

| 747,300 | 9/1944 | Germany | 432/179 |

OTHER PUBLICATIONS

Industrial Furnace, vol. I, 5th edition, by W. Trinks and Mawhinney, Copyright 1961, pp. 10–13.

Primary Examiner—John J. Camby
Assistant Examiner—Henry C. Yuen

[57] ABSTRACT

Exhaust heat from a slot furnace is recouped by a preheater unit consisting of a pipe mounted within a flue into which exhaust gasses pass through a slot, the flue being formed by a three-sided structure mounted on the outside wall of the furnace above the slot. Combustion air is supplied to the preheater pipe in a direction tangential and transverse to the pipe axis, and a passage leading from the preheater pipe to the furnace burner or burners is provided with means for controlling the temperature and volume of the preheated air supplied thereto.

13 Claims, 6 Drawing Figures

COMBUSTION AIR PREHEATER

This invention relates to improvements in a combustion air preheater for recouping exhaust heat from an industrial furnace, particularly a furnace of the slot type.

It is well known that the preheating of air employed for the combustion of fuel in a furnace will result in appreciable saving in the amount of fuel required for a desired operation of the furnace; or in other words, that by preheating the combustion air, more heat can be obtained from a given amount of fuel, or less fuel will be required to produce a given amount of heat. However, many furnaces which employ no preheating of combustion air are being used in industry.

The principal object of the present invention is to provide an improved construction of a combustion air preheater unit which can be applied to existing or new furnaces and especially to the slot furnaces which are widely used industrially. A slot furnace consists of an enclosed chamber heated by a burner or burners and having an open slot in one wall for the loading and unloading of workpieces. Exhaust heat continually escapes through the slot, is wasted, and these furnaces are very inefficient from the standpoint of fuel consumption.

For furnaces in general, the present invention provides a combustion air preheater for recovering exhaust heat from an enclosure forming at least a part of a flue of the furnace, and comprises a cylindrical preheater pipe mounted in the enclosure with the inlet and outlet ends of the pipe positioned externally of the enclosure, air inlet means connected to the inlet end of the preheater pipe for introducing air thereto in a direction generally tangential to the longitudinal axis thereof, and an air passage connecting the outlet end of the preheater pipe to the burner or burners of the furnace. Preferably, control means are provided for regulating a physical property such as the temperature, the volume, or both of these properties of the air passing through the preheater pipe and supplied to the burner or burners through the air passage.

For the slot furnace in particular, the present invention provides a combustion air preheater unit comprising structure providing wall means adapted to be mounted adjacent to the wall of the furnace in which the slot is located and form with this wall a flue positioned above and outwardly of the slot. An air preheater pipe carried by and within this structure has inlet and outlet openings located externally of the flue; and, the unit is completed by a bottom wall projecting outwardly from the furnace below the slot and below at least a part of the wall means of the structure to provide access for the loading and unloading of workpieces through the slot. Air inlet means is connected to the inlet opening of the preheater pipe and a passage connects the outlet end of the preheater pipe to the burner or burners.

Further features and advantages of the invention will appear from the description to follow of the presently preferred embodiment shown in the accompanying drawings, which illustrate the application of the invention to the preheater unit for a slot furnace.

DESCRIPTION OF THE PREFERRED EMBODIMENT

Figure 1:
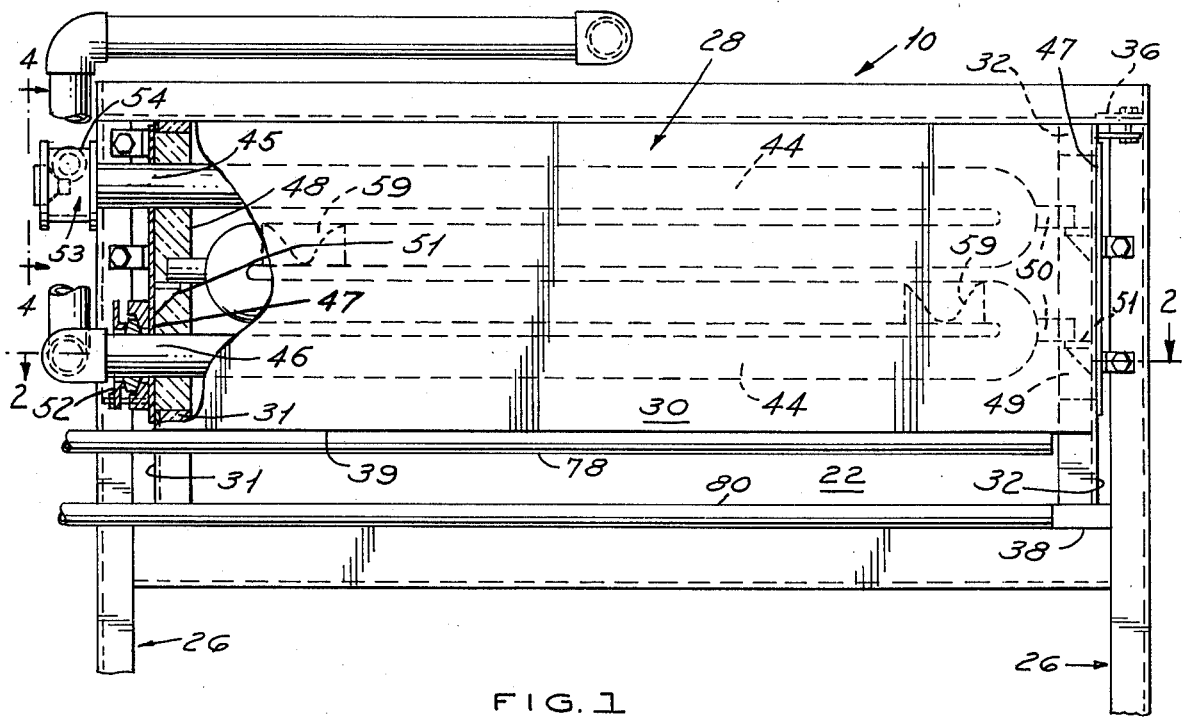
FIG. 1 is an elevation, partly in section, showing the front of a slot furnace with a preheater unit of the invention associated therewith.
Figure 2:
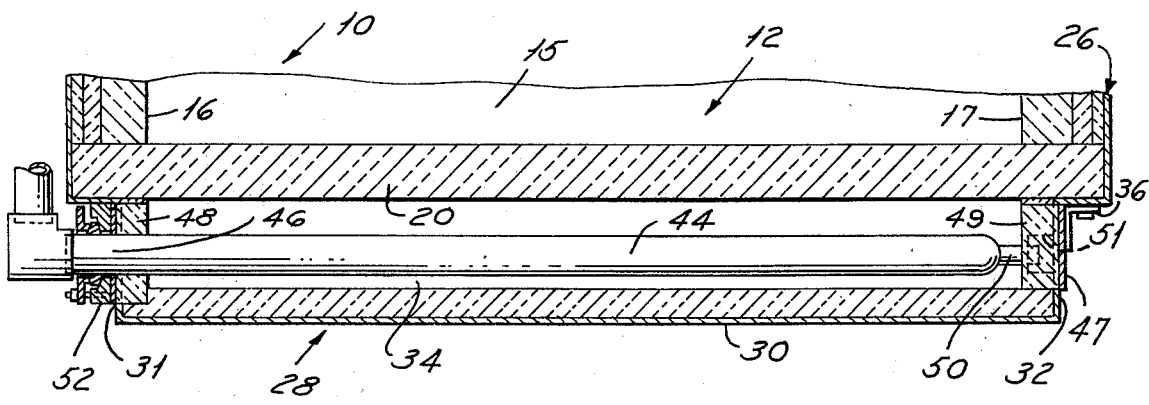
FIG. 2 is a fragmentary sectional plan view taken as indicated by the line 2—2 of FIG. 1.
Figure 3:
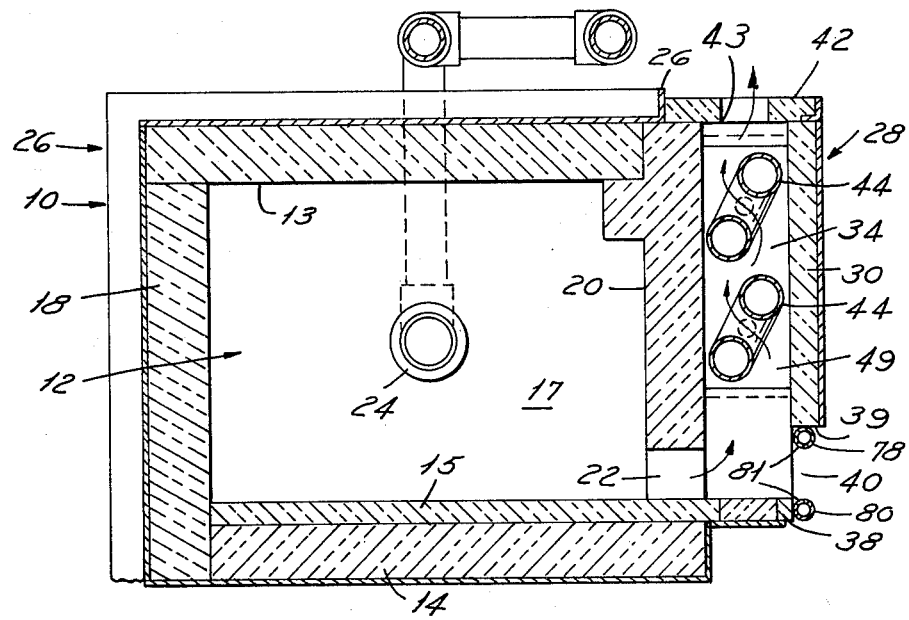
FIG. 3 is a sectional side elevation of the furnace of FIG. 1.

Referring to FIGS. 1–3, a conventional slot furnace 10 consists of a chamber 12 enclosed by a top wall 13, a bottom wall 14 and hearth 15, end walls 16 and 17, a rear wall 18, and a front wall 20 provided with a slot 22 in the lower portion thereof, above the level of the hearth 15. A burner 24 is mounted in each of the end walls 16 and 17 for heating the chamber 12, and exhaust gases from the chamber pass through the slot 22. Suitable structural steel members, designated generally by the reference 26, support the walls of the chamber 12. Since these structural members are conventional and may vary in arrangement from one furnace to another, they have not been shown in detail.

The preheater unit of the invention illustrated in the drawings is one which can be added to existing slot furnaces of the construction described above, or which can be incorporated into the construction of future furnaces of the slot type. A three sided refractory lined structure 28, providing wall means consisting of an outer wall 30 and sidewalls 31 and 32, is mounted adjacent to the front wall 20 of the furnace and defines with that wall 20 an insulated enclosure 34 forming a flue positioned above and outwardly of the slot 22, as best shown in FIG. 3. This preheater unit may be suitably supported from the structural members 26 of the furnace, as indicated by the reference 36 in FIGS. 1 and 2.

The lower portion of the enclosure 34 includes a bottom wall or shelf 38 which projects outwardly from the front wall 20 of the furnace below the slot 22 and lies below the lower portion 39 of the outer wall 30 of the unit in order to minimize the entrance of ambient air into the enclosure 34 and to provide an access opening 40 for the loading and unloading of workpieces through the slot 22. This shelf 38 is preferably lined with a suitable refractory material, as shown, but may also be constructed and arranged to provide a surface on which workpieces may be placed for preheating prior to being placed in the furnace; alternately, the shelf 38 may be formed by a conveyor moving lengthwise of the slot 22 for carrying workpieces from the furnace to a press or hammer operation. The upper end of the enclosure 34 is partially closed by firebrick 42 defining an opening 43 whose area is variable according to the placement and size of the firebrick, and a suitable exhaust stack may be connected to the opening, if desired.

A preheater air pipe 44, mounted within the enclosure described above, has an inlet end 45 and an outlet end 46 extending through the sidewall 31, and includes a suitable number of convolutions between the ends 45 and 46 to provide a desired amount of heat exchange surface, with the convolutions being vertically staggered as shown in FIG. 3. The inlet end 45 of the preheater pipe 44 may extend through and be fastened to a plate 47 forming part of a removable panel or bulkhead 48 of the sidewall 31, and the sidewall 32 includes a similar removable bulkhead 49. Suitable mounting means support the preheater pipe 44 on the structure of the preheater unit, such as pins 50 projecting from the ends of the convolutions and resting on brackets 51 carried by the bulkheads 48 and 49 of the sidewalls 31 and 32.

This preheater pipe 44 is formed of a material appropriately resistant to heat and exhaust gases, such as 330 stainless steel tubing having a diameter such as is required for the transfer of heat to the volume of air needed by the burners. Thermal expansion and contraction of the preheater pipe is accommodated by the sliding support provided by the pins 50 and brackets 51, and by an expansion type of connector 52 at the outlet end 46.

Figure 4:
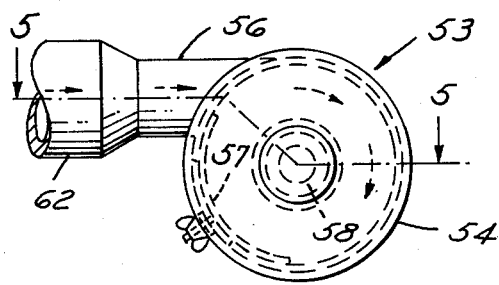
FIG. 4 is an elevation taken as indicated by the line 4—4 of FIG. 1 and showing, on an enlarged scale, the air inlet of the preheater unit.
Figure 5:
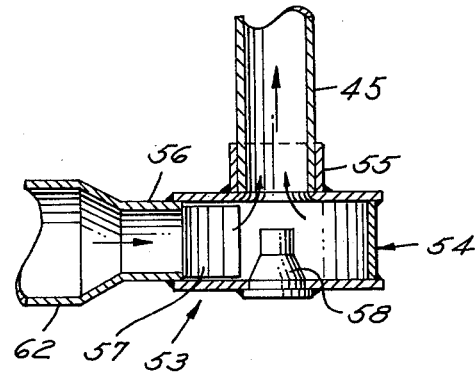
FIG. 5 is a sectional plan view taken as indicated by the line 5—5 of the FIG. 4; and, FIG. 6 is a schematic view illustrating the flow of air through the preheater unit to the furnace burners and control means for regulating the physical properties of the preheated air.

Connected to the inlet end 45 of the preheater pipe 44 is a fitting 53 (FIGS. 1, 4 and 5) which provides a means for introducing air to the pipe 44 in a direction generally tangential to the longitudinal axis thereof. This fitting 53 consists of a cylindrical housing 54 having a coaxial outlet opening 55 connected to the inlet end 45 of the preheater pipe, and having an inlet opening 56 which is directed transversely to the outlet opening 55, is spaced radially outwardly therefrom, and is equipped with a valve 57. The housing 54 and a generally cylindrical plug or baffle 58 mounted concentrically within the cylindrical housing 54, define an annular passage communicating tangentially with the inlet opening 56 and axially with the outlet opening 55. This air inlet fitting 53 produces a vortex type of airflow through the preheater pipe 44, thereby increasing the heat transferring capability of the preheater unit and providing a very simple construction for recouping heat from the exhaust gases. When the preheater pipe 44 includes a plurality of convolutions, air is introduced through the fitting 53 into the uppermost convolution, the velocity of the vortex motion of the air is controllable by the valve 57, and one or more of the return convolutions may be provided with an internal helical vane 59 (FIGS. 1 and 2) to continue the vortex motion.

Figure 6:
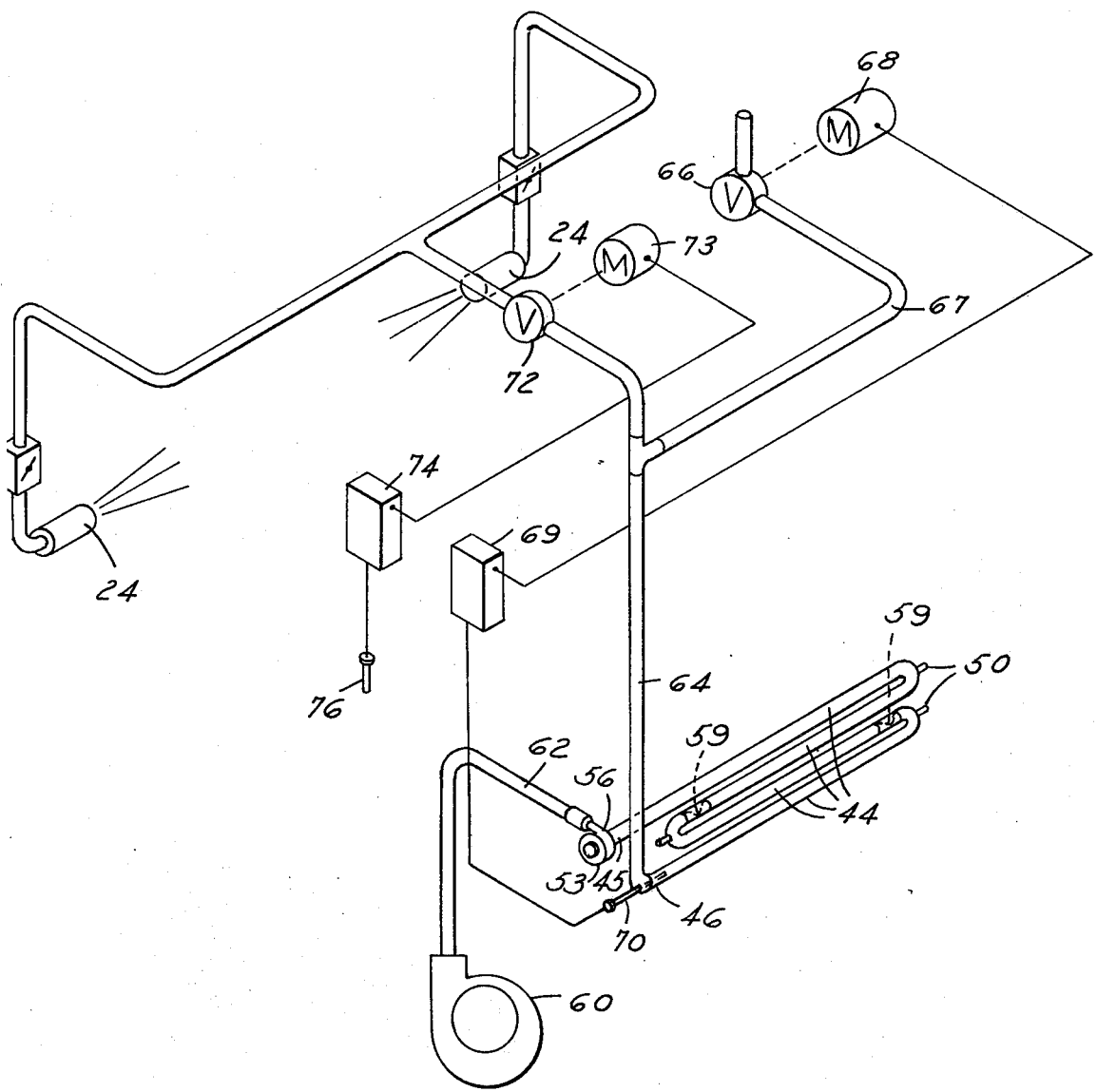

FIG. 6 schematically illustrates the operation of the preheater unit. Combustion air for the burners 24 is supplied by a blower 60 to the inlet fitting 53 through a tube 62, and the inlet opening 56 of the fitting 53 may be reduced in diameter from that of the tube 62 in order to increase the velocity of air entering the preheater pipe 44 and the vortex motion of this air. An air passage 64 connects the outlet end 46 of the preheater pipe 44 to the burners 24, and the passage 64 would be covered by suitable insulation (not shown).

The physical properties of the heated combustion air flowing through the passage 64 are controlled by suitable valves, preferably of the automatic type shown. A vent valve 66 installed in a branch line 67 leading from the passage 64 is operated by a motor 68 and by a regulator 69 responsive to the temperature of the preheated combustion air as sensed by a thermocouple 70 installed at the outlet end 46 of the preheater pipe. Opening of this valve increases the flow of air through the preheater pipe and hence decreases the temperature of the preheated air. A flow control valve 72 installed in the passage 64, is operated by a motor 73 and regulator 74 responsive to the temperature in the furnace chamber 12 as sensed by a thermocouple 76 installed therein. Since these motorized control valves 66 and 72 are commercially available from various manufacturers, they have not been shown in detail. The use of both a vent valve 66 and a flow control valve 72 may not be necessary in all installations, and, manually controlled valves may of course be used in place of the automatic type.

As shown in, FIGS. 1 and 3, a further control over the operation of the preheater unit is afforded by tubes 78 and 80 mounted above and below the access opening 40. Each tube has a longitudinally extending, radially directed passage 81, and is connected to a source of pressure or vacuum (not shown) to provide an air curtain for reducing heat radiation and the escape of flue gas from the preheater. The air curtain may be operated on a push-pull system by connecting one of the tubes 78 or 80 to pressure and the other to vacuum; on a pressure system by connecting both tubes to pressure; or, on a vacuum system by connecting both tubes to vacuum.

Also, the lower tube 80 can be employed as a means for introducing a coolant, such as air or steam, into the enclosure 34 in order to control the temperature therein and/or to prevent the escape of flue gas therefrom.

It will be seen from the foregoing that the invention provides a preheater unit of simple construction which can be used to improve the operating efficiency of slot furnaces. Those skilled in the art will readily appreciate that the enclosure 34, illustrated herein as an addition to a slot furnace, may also be formed by a flue in furnaces of other types. In other words, a suitable enclosure for the tangentially fed preheater pipe 44 can be provided by a flue of other types and designs of furnace, with any modifications necessary to the size of the flue or to the size and shape of the preheater pipe being within the capabilities of those skilled in the art.

I claim:

1. A combustion air preheater for recovering exhaust heat from an enclosure forming at least part of a flue of a furnace and supplying heated air to a burner of the furnace, comprising:

a cylindrical preheater pipe having an inlet end and an outlet end, means for mounting the preheater pipe in said enclosure with the inlet and outlet ends of the pipe located externally of the enclosure, air inlet means connected to the inlet end of the preheater pipe for introducing air thereto in a direction generally transverse and tangential to the longitudinal axis thereof, said air inlet means comprising a housing having an outlet opening connected to the inlet end of the preheater pipe and aligned axially therewith, said housing having an inlet opening directed transversely to the axis of the outlet opening and spaced radially outward of said axis, and a generally cylindrical baffle defining an annular passage communicating tangentially with the inlet opening and axially with the outlet opening;

an air passage connecting the outlet end of the preheater pipe to the burner, and control means operatively associated with said air passage for regulating at least one physical property of air supplied to the burner through said air passage.

2. A combustion air preheater according to claim 1 wherein said furnace includes structure supporting and forming a chamber enclosed by side walls, front and rear walls and a roof wall, one of said walls having an opening therein for the passage of flue gases, and said enclosure is mounted on said furnace structure in communication with said opening.

3. A combustion air preheater according to claim 1, wherein said furnace includes a front wall, a slot in the front wall for the loading and unloading of workpieces, said slot also serving as a passage for flue gases from the furnace, and a preheater unit attached to the furnace and having wall means arranged to form the enclosure in combination with the front wall of the furnace, the enclosure being located outwardly of and above the slot.

4. A combustion air preheater according to claim 3 wherein the enclosure includes a bottom shelf projecting outwardly from the front wall of the furnace and spaced below at least a portion of the wall means of the preheater unit to provide a workpiece loading and unloading opening substantially aligned with the slot.

5. A combustion air preheater according to claim 4 further including means for introducing a coolant to the enclosure through said opening.

6. A combustion air preheater according to claim 1 wherein said control means includes a vent valve connecting said passage to atmosphere.

7. A combustion air preheater according to claim 6 including means for controlling the setting of said vent valve in response to the temperature of the preheated air in said passage.

8. A combustion air preheater according to claim 1 wherein said control means includes a flow control valve in said passage.

9. A combustion air preheater according to claim 8 including means for controlling the setting of said flow control valve in response to the temperature in the furnace.

10. A combustion air preheater unit for use with a slot furnace having a burner and a front wall with a slot through which exhaust gases escape and workpieces are loaded and unloaded, said unit comprising:
structure providing three-sided wall means adapted to be mounted adjacent to said front wall and form therewith an insulated enclosure, said wall means including an outer wall spaced from said front wall and a pair of side walls each extending between said outer wall and front wall, a removable bulkhead provided in one of said side walls, and said outer wall having a lower portion;
a cylindrical air preheater pipe carried by the side walls of said structure and having an inlet end, an outlet end, and at least one convolution between said ends, at least one end of said preheater pipe extending through said removable bulkhead, and supporting means carried by at least one of said side walls for slidably supporting said pipe at the convolution therein; and,
a bottom wall projecting outwardly from said front wall of the furnace below said slot and below said lower portion of said outer wall to provide an opening aligned with said slot for the loading and unloading of workpieces through said slot.

11. A combustion air preheater unit according to claim 10 further including air inlet means for introducing air to the inlet opening of the air preheater pipe in a direction tangential and generally transverse to the longitudinal axis thereof.

12. A combustion air preheater unit according to claim 11 further including an air passage connecting the outlet opening of the air preheater pipe to the burner, and control means operatively associated with said air passage for regulating at least one physical property of air supplied to the burner through said passage.

13. A combustion air preheater unit according to claim 11 further including means for introducing a coolant to said flue below the level of the air preheater pipe.

* * * * *